Patented May 8, 1923.

1,454,078

UNITED STATES PATENT OFFICE.

EARL J. RUEB, OF OKLAHOMA, OKLAHOMA, ASSIGNOR TO MID-STATE BATTERY MANUFACTURING CO. INC., OF OKLAHOMA, OKLAHOMA, A CORPORATION OF OKLAHOMA.

STORAGE-BATTERY ELECTROLYTE.

No Drawing.  Application filed January 28, 1921. Serial No. 440,745.

*To all whom it may concern:*

Be it known that I, EARL J. RUEB, a citizen of the United States, residing at Oklahoma city, in the county of Oklahoma and State of Oklahoma, have invented certain new and useful Improvements in Storage-Battery Electrolytes, of which the following is a specification.

This invention relates to a novel storage battery electrolyte and has as its object to provide an electrolyte which will possess decided advantages over the sulphuric acid solution heretofore employed. The use of sulphuric acid as an electrolyte in storage batteries is attended by various disadvantages as for example the corrosive action of the acid solution when coming into contact with metal parts, clothing, etc., and its disintegrating effects upon the battery cells, connections, and separators. Therefore the invention contemplates an electrolyte which will be non-corrosive and which, instead of having a disintegrating and deteriorating effect upon the battery parts, will act rather as a preservative.

Another object of the invention is to provide an electrolyte which will tend to prevent disintegration of the battery plates and will possess a high degree of efficiency.

The electrolyte embodying the invention is intended primarily for use in connection with the battery grids formed and produced in accordance with the application of Hiram L. Edney, filed February 26, 1920, Serial No. 361,429, and in order that a better understanding may be had of the present invention, I will briefly describe the salient characteristics of the battery grid forming the subject matter of the said application.

In producing the positive plate in accordance with said application, one pint of sulphuric acid of 1200° specific gravity (Baumé) is mixed with one ounce of liquid collodion and stirred until a white scum appears on the surface after which the scum is removed and to the clear mixture is added ½ ounce of bicarbonate of soda and 1 ounce of glycerine. This mixture is then incorporated with a sufficient quantity of red lead to produce a stiff or almost dry paste which paste is filled into the lead grid of the plate, and the plate smoothed by any of the usual methods and dried in a warm place. The plate thus produced is then charged at for example ten amperes, when grouped with two other positive plates and four negative plates, and while immersed in a solution of 3 ounces of bicarbonate of soda and 1 ounce of aluminum sulphate in 1 quart of hard water. The negative plates are prepared in the same manner except that in the filler there is employed ¼ pint of sulphuric acid of 1150° specific gravity (Baumé) mixed with 2 ounces of glue.

In preparing a battery embodying positive and negative plates produced in the manner above briefly recited, for use in connection therewith of the electrolyte of the present invention, I first prepare a sulphuric acid solution of 1300° Baumé, introduce the same into the battery, and place the battery on a charging circuit at a normal rate of for example 10 or 15 amperes for a normal size battery of for example thirteen plates, and leave the battery on charge until the specific gravity, which has in the meantime fallen, is again brought to 1300° Baumé. The battery is then discharged and again charged at the same rate and until the electrolyte reaches 1300° Baumé. The battery is then drained and the elements are taken out and thoroughly washed with hard water.

After replacement of the battery elements, the battery is ready for the electrolyte embodying the invention and in preparing this electrolyte I make a solution of 2 ounces of powdered alum (aluminum-potassium sulphate) in 1 pint of hard water and pour the solution into the battery cells and then recharge the battery at the normal rate mentioned above and until the electrolyte shows a test of 1150 to 1200° specific gravity (Baumé). The battery is then ready to be put into service and when practically fully discharged the electrolyte will have a specific gravity of between 800 and 900° (Baumé).

I have found that an electrolyte prepared as above will withstand heavy charging and will be highly efficient on discharge, and have also found that the same will preserve rather than deteriorate the active material of the battery grids and will likewise preserve the battery separators where these elements are made of wood. Also the electrolyte will have no deteriorating action on rubber jars or other parts and will not corrode metal or be injurious to the clothing if spilled thereon.

Having thus described the invention, what is claimed as new is:

1. A storage battery electrolyte including aluminum-potassium sulphate as one of its ingredients.

2. A storage battery electrolyte comprising a solution of approximately two ounces of aluminum-potassium sulphate in one pint of hard water.

In testimony whereof I affix my signature.

EARL J. RUEB. [L. S.]